3,642,701
COPOLYMERS OF TRIOXANE AND PROCESS FOR THEIR MANUFACTURE

Karl-Heinz Häfner, Bad Orb, Germany, assignor to Farbwerke Hoechst Aktiengesellschaft vormals Meister Lucius & Brüning, Frankfurt am Main, Germany
No Drawing. Filed July 7, 1969, Ser. No. 839,639
Claims priority, application Germany, July 10, 1968,
P 17 70 835.9
Int. Cl. C08g 1/18
U.S. Cl. 260—67 S     6 Claims

ABSTRACT OF THE DISCLOSURE

Modified copolymers of trioxane which are a suitable basis for polyacetal dispersions, are manufactured by cationic polymerization of trioxane, and bifunctional aromatic glycide-oxy-sulfonic acid esters, if desired in the presence of cyclic ethers or cyclic or linear acetals.

---

The present invention relates to copolymers of trioxane and a process for their manufacture.

It is known that trioxane can be copolymerized under the action of cationic catalysts with cyclic ethers having at least two vicinal carbon atoms in the ring to obtain copolymers, which are stable against alkaline degradation and are valuable plastic materials because of their good mechanical and physical properties. Those copolymers have, however, the drawback, that they cannot be modified subsequently by chemical reactions in the chain itself, with the exception of chemical stabilizing reactions at the end of the polymer chain.

It is also known to copolymerize trioxane with bifunctional compounds, for example cyclohexene-1,2-oxide-4,4-dioxymethylene-formal and $\beta,\gamma$-epoxy-propoxy-$\beta',\gamma$-carbonatopropoxy-alkanes. The polymers thereby obtained are cross-linked either already under the polymerization conditions or in the subsequent heat treatment.

Furthermore, it is known to polymerize trioxane with sulfones or glycidic acid esters in the presence of cationic catalysts which copolymerization leads to copolymers of oxymethylene with reactive groups in the side chains of the polymer molecules (U.S. Pat. 3,284,411).

The present invention provides copolymers of trioxane comprising, in statistical distribution, in the macromolecule 70 to 99.99, preferably 85 to 99% of oxymethylene units, 0 to 10, preferably 0 to 5% of oxyalkylene units having 2 to 8, preferably 2 to 4 carbon atoms, and 0.01 to 20, preferably 1 to 10% of structural units of the Formula I (I) 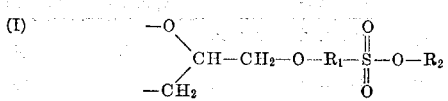

in which $R_1$ represents a bivalent aromatic hydrocarbon radical having 6 or 10 carbon atoms, which may be substituted one to four times by an alkyl radical having 1 to 6, preferably 1 to 3 carbon atoms, and $R_2$ represents an alkyl radical having 1 to 6, preferably 1 to 3 carbon atoms.

This invention also provides a process for the manufacture of copolymers of trioxane by polymerization of 70 to 99.99, preferably 85 to 99% by weight of trioxane, 0.01 to 20, preferably 1 to 10% by weight of bifunctional compounds and 0 to 10% by weight, preferably 0 to 5% by weight of cyclic ethers or cyclic or linear acetals in the presence of cationic catalysts at temperatures within the range of from −50 to +110° C., preferably +30° to +90° C., which comprises using as bifunctional compounds aromatic glycide-oxy-sulfonic acid esters of the Formula II (II) 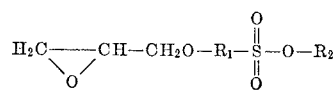

in which $R_1$ represents a bivalent aromatic hydrocarbon radical having 6 or 10 carbon atoms, which may be substituted one to four times by an alkyl radical having 1 to 6, preferably 1 to 3 carbon atoms, and $R_2$ represents an alkyl radical with 1 to 6, preferably 1 to 3 carbon atoms.

As bifunctional compounds there are advantageously used glycide-oxy-benzene-sulfonic acid esters of the Formula III (III) 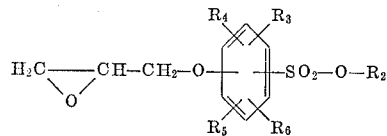

in which $R_2$ has the meaning given above and $R_3$, $R_4$, $R_5$ and $R_6$ are identical or different and each represent a hydrogen atom or an alkyl radical having 1 to 6, preferably 1 to 3 carbon atoms. Especially suitable are unsubstituted glycideoxy-benzene-sulfonic acid esters of the Formula IV (IV) 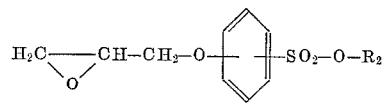

in which $R_2$ has the meaning given above.

There may also be used glycide-oxy-naphthalene-sulfonic acid esters of the Formula V (V) 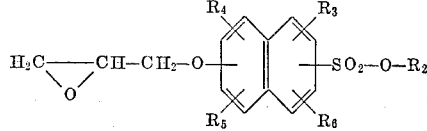

in which $R_2$, $R_3$, $R_4$, $R_5$ and $R_6$ have the meaning given above.

Bifunctional compounds used in accordance with the invention are, for example, p-glycide-oxy-benzene-sulfonic acid-methyl ester, p-glycide-oxy-benzene-sulfonic acid-ethyl ester, 2-glycide-oxy-toluene-sulfonic acid-(5)-methyl ester and 1-glycide-oxy-naphthalene-sulfonic acid-(4)-methyl ester.

In addition to trioxane and the bifunctional compounds there may also be used cyclic ethers or cyclic or linear acetals in amounts of from 0 to 10, preferably 0 to 5% by weight, calculated on the total monomer mixture. Especially suitable are cyclic ethers with 3 to 5 ring members, preferably epoxides, for example ethylene oxide and epichlorhydrin, and cyclic acetals with 5 to 11, preferably 5 to 8 ring members, preferably cyclic formals of αω-diols having 2 to 8, preferably 2 to 4 carbon atoms, the carbon chain of which may be interrupted by an oxygen atom at intervals of two carbon atoms, for example 1,3-dioxolane, 1,3-dioxepane and 1,3,6-trioxocane, as well as linear polyformals, for example polydioxolane.

As cyclic ethers there may also be used propylene oxide, styrene oxide, cyclohexene oxide, phenyl-glycidyl ether, butane-diol-diglycidyl ether and oxetane, while as cyclic formals 4-chloro-methyl-1,3-dioxolane, 1,3-dioxonane and 1,3-dioxa-cycloheptene (5) may also be used.

By using the above mentioned co-components polyacetals are obtained which contain in the macromolecular chain, in addition to oxymethylene units of the formula —OCH$_2$—, groups with several vicinal carbon atoms, advantageously oxyalkylene units of the formula —O—(CH$_2$)$_x$—, in which $x$ is a whole number from 2 to 8, preferably from 2 to 4.

By the process in accordance with the invention, copolymers are obtained in which the comonomer containing the sulfonic ester groups is incorporated in the macromolecular chain. Thus, the bands characteristic of the sulfone grouping appear in the infrared spectrum of copolymers of trioxane, ethylene oxide and p-glycide-oxy-benzene-sulfonic acid methyl ester which have been subjected to an alkaline treatment in benzyl alcohol at 150° C. and then repeatedly boiled with methanol. The amount of sulfonic acid ester in the copolymer is within the range of from 0.01 to 20, preferably 0.1 to 10%.

The copolymers according to the invention may be chemically modified by a subsequent treatment with agents which react with sulfonic ester groups. Thus, the ester groups may be saponified with alkalis, especially with hydroxides or alcoholates, for example sodium hydroxide, barium hydroxide, calcium hydroxide and sodium methylate.

The reduced specific viscosities (RSV values $\eta_{red}$) of the copolymers in accordance with the invention (measured at 140° C. on 50 milligrams of the polymer dissolved in 10 milliliters of butyrolactone containing 2% by weight of diphenyl amine) are within the range of from 0.05 to 1.0, preferably from 0.10 to 0.70 dl./g.

The cationic polymerization is carried out in the melt, in solution or in suspension according to known methods. As solvents or dispersing agents, aliphatic or cycloaliphatic hydrocarbons with 5 to 18 carbon atoms which are inert to the monomers and the catalyst, for example n-hexane or cyclohexane, may be used. The polymerization is, however, preferably carried out in the melt at temperatures within the range of from +60° to +110° C.

For initiating the copolymerization in accordance with the invention, cationic initiators, advantageously protonic acids, for example perchloric acid, and, preferably Lewis acids (for a definition of Lewis acids see: Kortüm, Lehrbuch der Elektrochemie, Wiesbaden 1948, pages 300 and 301), preferably boron trifluoride may be used. The latter is advantageously used in the form of its addition or complex compounds, for example as etherate, oxonium fluoroborate or substituted aryl diazonium fluoroborate. The concentration of the catalysts depends in the first place on their activity as initiators and is within the range of from 0.0001 to 1.0, preferably 0.001 to 0.2% by weight, calculated on the total monomer mixture.

To remove the unstable terminal semi-acetal groups, the copolymers in accordance with the invention may be subjected to an alkaline degradation known in itself (as described in Belgian Pat. 617,897). Light, heat and oxydation stabilizers are advantageously added to the copolymers. As light stabilizers there are used, for example, α-hydroxybenzophenone derivatives, suitable heat stabilizers are polyamides, amides of polybasic carboxylic acids, amidines, hydrazines, ureas and poly-N-vinyl lactams and, as oxidation stabilizers there are used phenols, advantageously bisphenols, and aromatic amines, in a total amount within the range of from 0.1 to 10, preferably 0.5 to 5% by weight, calculated on the copolymer of trioxane.

The copolymers in accordance with the invention are important starting materials for the manufacture of polyacetal dispersions. They are preferably processed into copoylmers with ion groupings.

The following examples serve to illustrate the invention but are not intended to limit it, the parts being by weight.

EXAMPLE 1

5 milliliters of a solution of 1 part of BF$_3$-dibutyl etherate in 40 parts of cyclohexane as catalyst were added to a mixture consisting of 90 grams of trioxane and 10 grams of p-glycide-oxy-benzene-sulfonic acid methyl ester. The mixture was polymerized at 70° C. in a closed vessel on a thermoconstant bath. The polymerization time was 60 minutes. The polymer block so obtained was ground and treated at 150° C. for 30 minutes in benzyl alcohol which contained 1% by weight of ethanol amine, to remove the unstable terminal semi-acetal groups and the residual monomers. After cooling, the polymer was suction filtered, repeatedly boiled with methanol and dried at 50 to 70° C. under pressure. The yield of polymer was 52 grams.

The polymer showed the following values:

Reduced specific viscosity $\eta_{red}$=0.12 dl./g. (50 milligrams of the polymer were dissolved at 140° C. in 10 milliliters of butyrolactone which contained 2% by weight of diphenyl amine and the viscosity was measured at this temperature).

1.5% of sulfur was determined analytically (calculated 1.3%); this value corresponded to an amount of sulfonic acid ester in the polymer of 4.5%.

EXAMPLE 2

As in Example 1, 95 grams of trioxane, 2 grams of ethylene oxide and 2 grams of p-glycide-oxy-benzene-sulfonic acid methyl ester were polymerized with 3 milliliters of BF$_3$-dibutyl etherate (ratio 1:40). After the alkaline degradation the yield was 78 grams.

The following values were found:

$\eta_{red}$=0.35 dl./g.
sulfur: 0.3% (calculated value: 0.23%)
amount of sulfonic acid ester: 0.9%.

EXAMPLE 3

As in Example 1, 88 grams of trioxane, 2 grams of ethylene oxide and 10 grams of p-glycide-oxy-benzene-sulfonic acid methyl ester were polymerized with 5 milliliters of BF$_3$-dibutyl etherate (ratio 1:40). After the alkaline degradation the yield was 72 grams.

The following values were found:

$\eta_{red}$=0.20 dl./g.
sulfur: 1.5% (calculated value: 1.3%)
amount of sulfonic acid ester: 4.5%.

EXAMPLE 4

As in Example 1, 91 grams of 1,3-dioxolane and 5 grams of p-glycide-oxy-benzene-sulfonic acid methyl ester were polymerized with 5 milliliters of BF$_3$-dibutyl etherate (ratio 1:40). After the alkaline degradation the yield was 72 grams.

The following values were found:

$\eta_{red}$=0.27 dl./g.
sulfur: 0.5% (calculated value: 0.66%)
amount of sulfonic acid ester: 1.5%.

What we claim is:

1. A copolymer of trioxane consisting essentially of, in statistical distribution, in the macromolecule, 70 to 99.99% of oxymethylene units, 0 to 10% of oxyalkylene units with 2 to 8 carbon atoms and 0.01 to 20% of structural units of the Formula I (I) 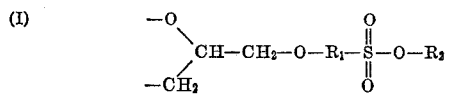

in which $R_1$ represents a bivalent aromatic hydrocarbon radical having 6 or 10 carbon atoms, which may be substituted one to four times by an alkyl radical having 1 to 6 carbon atoms and $R_2$ represents an alkyl radical having 1 to 6 carbon atoms.

2. A copolymer as defined in claim 1 wherein $R_1$ is phenylene.

3. A copolymer as defined in claim 1 wherein $R_1$ is tolylene.

4. A copolymer as defined in claim 1 wherein $R_1$ is naphthylene.

5. A copolymer as defined in claim 1 wherein $R_2$ is methyl.

6. A copolymer as defined in claim 1 wherein $R_2$ is ethyl.

References Cited

UNITED STATES PATENTS 3,272,779  9/1966  Reich _____ 260—67 S
3,442,860  5/1969  Hafner et al. _____ 260—52

WILLIAM H. SHORT, Primary Examiner

L. M. PHYNES, Assistant Examiner

U.S. Cl. X.R.

260—45.8 A, 45.8 N, 45.9 P, 45.95, 67 A